United States Patent
Walsh et al.

(10) Patent No.: US 10,963,311 B2
(45) Date of Patent: Mar. 30, 2021

(54) TECHNIQUES AND ARCHITECTURES FOR PROTECTION OF EFFICIENTLY ALLOCATED UNDER-UTILIZED RESOURCES

(71) Applicant: salesforce.com, inc., San Francisco, CA (US)

(72) Inventors: James E. Walsh, Woodinville, WA (US); Sameer Tiwari, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 165 days.

(21) Appl. No.: 15/282,341

(22) Filed: Sep. 30, 2016

(65) Prior Publication Data

US 2018/0095803 A1 Apr. 5, 2018

(51) Int. Cl.
*G06F 9/46* (2006.01)
*G06F 9/50* (2006.01)

(52) U.S. Cl.
CPC .......... *G06F 9/5061* (2013.01); *G06F 9/5016* (2013.01); *G06F 9/505* (2013.01)

(58) Field of Classification Search
CPC ........ G06F 9/50; G06F 9/5011; G06F 9/5016; G06F 9/5022; G06F 9/5027; G06F 9/505; G06F 9/5061; G06F 9/5077; G06F 9/5083
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |

(Continued)

OTHER PUBLICATIONS

Non-Final Office Action for U.S. Appl. No. 15/282,322 dated Jun. 7, 2018, 10 pages.
Non-Final Office Action for U.S. Appl. No. 15/282,335 dated May 14, 2018, 8 pages.

(Continued)

*Primary Examiner* — Hiren P Patel
(74) *Attorney, Agent, or Firm* — Jaffery Watson Mendonsa & Hamilton LLP

(57) ABSTRACT

A computing environment having a first plurality of executing processes being executed by one or more processors. The executing processes each have associated resources. The executing processes utilize the associated resources. A consumed portion of a resource that is utilized by a selected executing process from the first plurality of executing resources is determined. An unconsumed portion of the resource is estimated. A first preselected amount of the unconsumed portion is allocated for utilization by a process not in the first plurality. A second preselected amount of the unconsumed portion is reserved as a fence between the consumed portion and the allocated first preselected amount of the unconsumed portion.

25 Claims, 6 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,104,039 B2* | 1/2012 | Huizenga ............... G06F 9/5061 718/104 |
| 8,108,869 B2* | 1/2012 | Jackson ................. G06F 9/5072 718/104 |
| 8,108,872 B1* | 1/2012 | Lindholm .............. G06F 9/5016 718/104 |
| 8,301,772 B2* | 10/2012 | Zeis .................... G06F 11/1458 709/226 |
| 8,505,022 B2* | 8/2013 | Helander ................ G06F 9/50 718/104 |
| 8,667,496 B2* | 3/2014 | Levin .................... G06F 9/5077 718/104 |
| 8,874,747 B2* | 10/2014 | Boldyrev .............. G06F 9/5083 709/226 |
| 9,069,610 B2* | 6/2015 | Chakravorty ............. G06F 9/50 |
| 9,953,276 B2* | 4/2018 | Gaurav .................. G06Q 10/04 |
| 10,838,770 B2* | 11/2020 | Nutter ...................... G06N 5/04 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0053011 A1* | 5/2002 | Aiken ................... G06F 9/5016 711/170 |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0184287 A1* | 8/2006 | Belady .................. G06F 1/3203 700/291 |
| 2008/0013829 A1* | 1/2008 | Stebbings ......... G06F 17/30781 382/172 |
| 2009/0025004 A1* | 1/2009 | Barnard .................... G06F 9/50 718/104 |
| 2009/0177744 A1 | 7/2009 | Marlow et al. |
| 2011/0145392 A1 | 6/2011 | Dawson et al. |
| 2012/0131180 A1* | 5/2012 | Nomura ................. G06F 9/5077 709/224 |
| 2012/0174097 A1* | 7/2012 | Levin .................... G06F 9/5077 718/1 |
| 2012/0265881 A1* | 10/2012 | Chen ....................... H04L 12/12 709/226 |
| 2012/0290725 A1 | 11/2012 | Podila |
| 2013/0117762 A1* | 5/2013 | Yamashita .............. G06F 9/485 719/313 |
| 2013/0304903 A1 | 11/2013 | Mick et al. |
| 2013/0346969 A1* | 12/2013 | Shanmuganathan ....... G06F 9/4856 718/1 |
| 2014/0007097 A1* | 1/2014 | Chin .................. G06F 9/45533 718/1 |
| 2014/0025890 A1* | 1/2014 | Bert ..................... G06F 12/0842 711/118 |
| 2014/0068335 A1* | 3/2014 | Bromley ................. H04L 43/50 714/32 |
| 2014/0325149 A1 | 10/2014 | Misra et al. |

(56) References Cited

U.S. PATENT DOCUMENTS

| | | | | |
|---|---|---|---|---|
| 2014/0359356 | A1* | 12/2014 | Aoki | G06F 11/1441 |
| | | | | 714/24 |
| 2014/0380307 | A1* | 12/2014 | Zhu | G06F 9/45533 |
| | | | | 718/1 |
| 2015/0355943 | A1* | 12/2015 | Harris | G06F 9/5083 |
| | | | | 718/104 |
| 2016/0098297 | A1 | 4/2016 | Yuyitung et al. | |
| 2016/0274814 | A1* | 9/2016 | Zhang | G06F 9/45558 |
| 2016/0306672 | A1* | 10/2016 | Chin | G06F 9/5038 |
| 2016/0330137 | A1* | 11/2016 | Avci | G06F 9/5016 |
| 2017/0373988 | A1* | 12/2017 | Soffe | G06Q 40/025 |
| 2018/0006903 | A1* | 1/2018 | Ganguli | H04L 41/5009 |
| 2018/0095664 | A1* | 4/2018 | Walsh | G06F 3/0604 |
| 2018/0097702 | A1* | 4/2018 | Walsh | H04L 41/14 |
| 2018/0143852 | A1* | 5/2018 | Ballantyne | G06F 9/5027 |
| 2019/0155651 | A1* | 5/2019 | Di Cairano-Gilfedder | |
| | | | | G06F 9/5061 |
| 2020/0042338 | A1* | 2/2020 | Poothia | G06F 3/067 |

OTHER PUBLICATIONS

Final Office Action for U.S. Appl. No. 15/282,322 dated Oct. 11, 2018, 12 pages.
Final Office Action for U.S. Appl. No. 15/282,335 dated Sep. 26, 2018, 9 pages.
Non-Final Office Action for U.S. Appl. No. 15/282,322 dated Mar. 21, 2019, 9 pages.
Non-Final Office Action for U.S. Appl. No. 15/282,335 dated Mar. 21, 2019, 8 pages.
Final Office Action for U.S. Appl. No. 15/282,335 dated Aug. 16, 2019, 9 pages.
Final Office Action for U.S. Appl. No. 15/282,322 dated Nov. 22, 2019, 10 pages.
Non-Final Office Action for U.S. Appl. No. 15/282,335 dated Dec. 13, 2019, 9 pages.
Final Office Action for U.S. Appl. No. 15/282,335 dated Mar. 30, 2020, 11 pages.
Non-Final Office Action for U.S. Appl. No. 15/282,322 dated Aug. 12, 2020, 10 pages.

* cited by examiner

TECHNIQUES AND ARCHITECTURES FOR PROTECTION OF EFFICIENTLY ALLOCATED UNDER-UTILIZED RESOURCES

TECHNICAL FIELD

Embodiments relate to efficient utilization of resources utilizing dynamic fencing functionality. More particularly, embodiments relate to techniques for efficiently identifying non-utilized (or under-utilized) resources to be allocated for more efficient utilization by partial re-allocation and dual-sided fencing techniques to protect processes using the shared resources.

BACKGROUND

Computing environments often include resources that are not fully utilized during normal operating conditions. For example, in a multitenant environment resources (e.g., processor capacity, memory space, bandwidth, cache memory access, database service) can be designed based on anticipated peak loads. However, during normal operation, many of these resources may be unused or lightly used. Thus, there may exist valuable resources that are not utilized as efficiently as possible.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

In data centers and other environments in which computing resources are provided, maximizing host utilization is important for running a highly efficient service/business. While the examples that follow may focus on four main components (processor, memory, storage, network), the techniques described herein are applicable to other resources as well. During normal operation, there may be unutilized capacity across one or more resources.

Described herein are techniques to make unused and/or underutilized resources available for other purposes. In various embodiments, this can be accomplished without impacting the native/existing processes running on the host. In one embodiment, the host can both allocate and free resources based on monitoring, projection and/or back off strategies.

In one embodiment, the system predicts a load on a host based on, for example, ad hoc and/or machine learned data. In one embodiment, this is performed by a load predictor or other entity. In one embodiment, the system can take inputs from the load predictor to allocate and/or free resources without impacting native processes. In one embodiment, this is performed by a resource allocator or other entity.

There may be situations in which the native process receives a traffic burst or other condition that requires additional resources beyond what had been allocated. This would result in allocation of additional resources, but if the resources have already been reallocated to other processes/hosts, the native process will be negatively impacted. Unless the native process has the ability to notify the allocation mechanism, the native process may suffer resource starvation. Various embodiments of mechanisms and architectures that utilize "allocation fencing" are described herein to avoid resource starvation as described.

It should be noted that "allocation fencing" as described herein is not the same as "fencing" as known in the art. Traditional "fencing" is the process of isolating a node of a cluster or protecting shared resources when a node is malfunctioning. For example, the malfunctioning node/resource may have some control over a shared resource that should be reclaimed. For example, a virtual fence may separate an active node from its backup.

In one embodiment, under-utilized resources are identified as described below with respect to FIG. 1. The identified under-utilized resources can have portions made available to other processes as described below.

Figure 1:
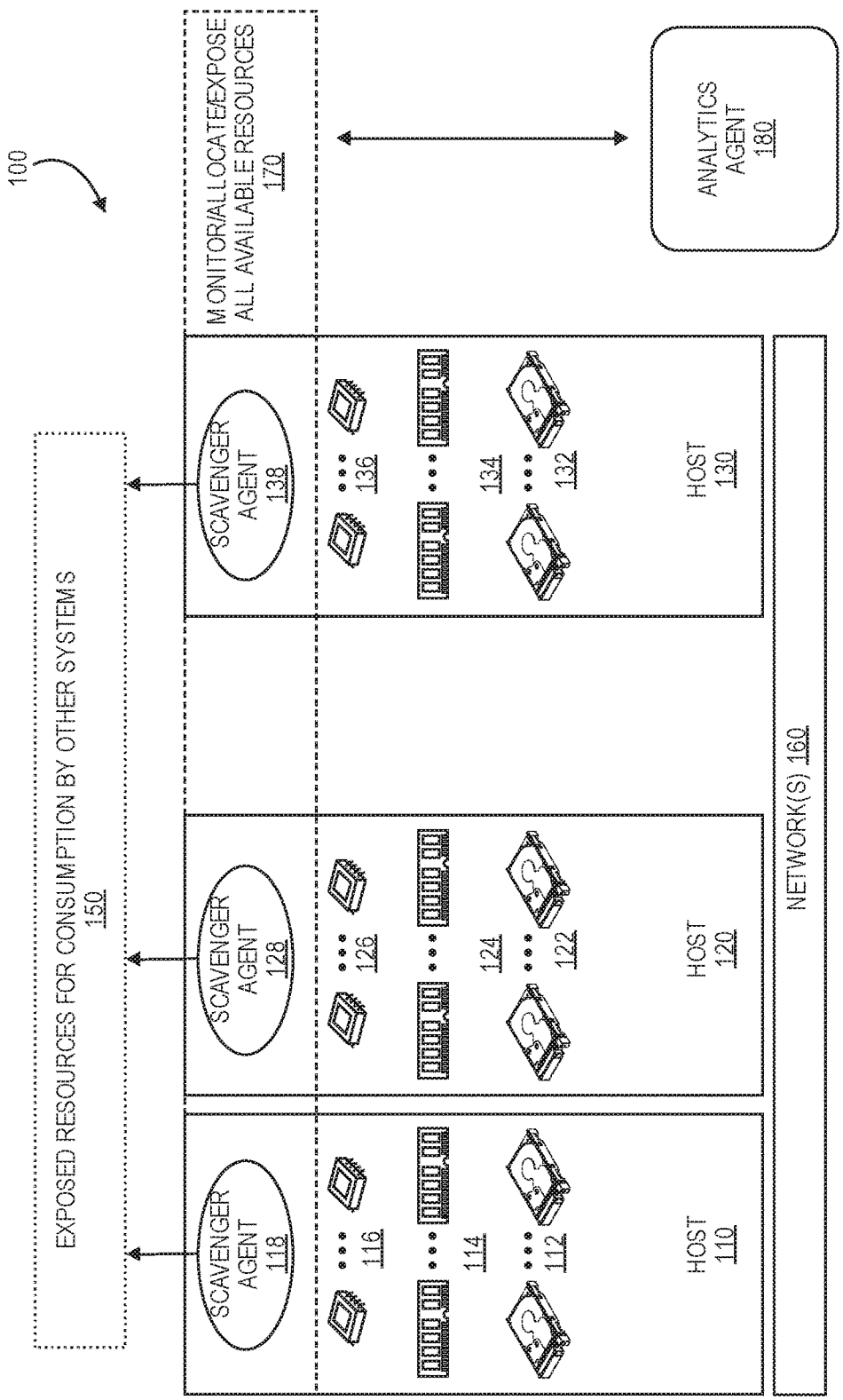
FIG. 1 is a block diagram of one embodiment of an architecture that can provide efficient allocation of under-utilized resources as described herein.

FIG. 1 is a block diagram of one embodiment of an architecture 100 that can provide efficient allocation of under-utilized resources as described herein. The example of FIG. 1 includes three host systems (110, 120, 130); however, any number of host systems can be supported. Further, the example of FIG. 1 illustrates only memory/storage resources that can be exposed for consumption by other systems; however, the example of FIG. 1 provides a basic example of the techniques described herein and not an exhaustive listing of possible uses. As described elsewhere in the present description, many types of resources can be exposed and/or reallocated as described herein.

Host systems 110, 120, 130 can be any type of computing platform having one or more resources that may be underutilized. Host systems 110, 120, 130 can be interconnected by one or more networks 160 that can be any combination of wired and/or wireless networks.

While the example of FIG. 1 illustrates three systems that appear the same, the various resources may have different characteristics in different host systems. For example, the disk drives 112 of host 110 may have different characteristics (e.g., storage capacity, speed, bandwidth, reliability, energy consumption, available capacity), which may be the same or different than the disk drives (122, 132, respectively) of hosts 120, 130. Similarly, cache memory (114, 124, 134) and solid state drives (SSDs) 116, 126, 136 can have varying characteristics.

In one embodiment, each host system has an embedded scavenger agent (118, 128, 138) that functions to monitor and/or evaluate the utilization of one or more resources within the corresponding host system. In one embodiment, scavenger agents 118, 128, 138 have some control or influence over allocation of resources within the respective host systems. For example, if scavenger agent 128 determines that 50% of cache memory 124 is being utilized by host system 120, scavenger agent 128 can 50% (plus some buffer amount, for example, +5%, +10%) to be allocated to host system 120 and the remaining portion (e.g., 45%, 40%) can be exposed for use by other systems, for example, host 110 and/or host 130.

In one embodiment, each scavenger agent further functions to expose, advertise and/or otherwise indicate resources that are available in the host systems monitored by the respective scavenger agents. In one embodiment, a monitoring agent/entity 170 external to the host systems can collect information from one or more of the scavenger agents. In alternate embodiments, monitoring agent 170 can be provided by one or more of the host systems.

In one embodiment, unused resources and/or under-utilized resources can be exposed by the scavenger agents to allow other host systems to use these resources 150. Various techniques can be utilized to expose/advertise the availability of these resources. For example, a single listing or entity can provide identification and/or capacity available from other resources. A listing can be, for example, a table in a database, an XML file, etc. An agent/daemon/thread/entity can be responsible for managing information related to available scavenged resources and/or matching the resources to requests for additional resources.

In one embodiment, monitoring agent 170 can function to collect information from the various scavenging agents to expose all available resources to all (or a subset) of the host systems within a larger environment. For example, host systems 110, 120, 130 can be part of an on-demand services environment that functions to provide services to various users. An on-demand services environment can be, for example, a multitenant database environment, a customer relationship management (CRM) environment, etc. Various embodiments of on-demand service environments are described below.

In one embodiment, analytics agent 180 functions to gather utilization information from various hosts and can use this information to make load predications and/or provide this information to one or more load prediction agents to be used in making load predictions. Information can include, for example, historical statistical information such as cache utilization tracked by time of day. Any type of analytics can be utilized by analytics agent 180. Scavenging functionality is described in greater detail in U.S. patent application Ser. No. 15/282,322, filed Sep. 30, 2016 and entitled "TECHNIQUES AND ARCHITECTURES FOR EFFICIENT ALLOCATION OF UNDER-UTILIZED RESOURCES," by James Walsh and Sameer Tiwari, which is incorporated by reference herein.

In one embodiment, within a data center having many physical computing systems, clustering techniques can be applied based on sets of features (e.g., throughput, latency, processor availability) to determine one or more groups of similar resource characteristics across these physical computing systems. Groups made this way perform in a more predictable manner than more random sets. Resources can be grouped together into working sets (as discussed above). Various embodiments can support any number of working sets across any number of host physical computing systems.

In one embodiment, these hosts can also be mapped into "availability zones" that can be utilized to provide high-availability services. Availability zones can be associated with units of failure. For example, storing multiple copies of data on a single disk results in very low availability if the disk were to crash. Storing the data across multiple disks on a single host is a level up in availability. Storing the data across multiple disks across multiple hosts is another level up (two total) in availability. Storing the data across multiple hosts across multiple racks is another level up (three total) in availability. Storing the data across multiple data centers is another level up (four total) in availability.

The following are a few examples to describe possible clustering strategies. A low performance dynamic random access memory (DRAM) might be equivalent to a high performance 3D XPoint storage and can be grouped together in a working set. A high performance hard disk might be equivalent to a low performance old solid state drive (SSD) and can be grouped together in a working set. Within a single hard drive there may be some blocks that are higher performance than other blocks and can be exposed as a separate working set. In one embodiment, each working set can expose an orthogonal feature of an availability zone. Clustering functionality is described in greater detail in U.S. patent application Ser. No. 15/282,335, filed Sep. 30, 2016 and entitled "TECHNIQUES AND ARCHITECTURES FOR EFFICIENT ALLOCATION OF UNDER-UTILIZED RESOURCES," by James Walsh and Sameer Tiwari, which is incorporated by reference herein.

The following allocation fencing example is based on memory as a scavenable (and possibly clusterable) resource. The example is based on a host system having 128 GB of physical random access memory (RAM) and is running native process A with a physical processor within the system. The load prediction mechanism predicts that 64 GB of memory will be free for the next 15 minutes. The resource allocation mechanism is notified that 64 GB will be free for the next 15 minutes and the resource allocation mechanism can allocate a portion of the free 64 GB.

In one embodiment, the portion is determined as a percentage of the whole that can be determined by the resource allocation mechanism. Various techniques for determining the percentage are described in greater detail below. In this example 60 GB of the free 64 GB is allocated to one or more other processes. The non-allocated 4 GB is the resource fence in this example.

In one embodiment, the fence portion of the resource is closely monitored and is used for handling unpredicted loads. If, for example, there is a spike in load and the native process requires some of the memory within the fence portion, the resource allocation mechanism can take action by emptying the allocated (60 GB) portion of the resource (e.g., by copying data to another resource or deleting the data).

Figure 2:
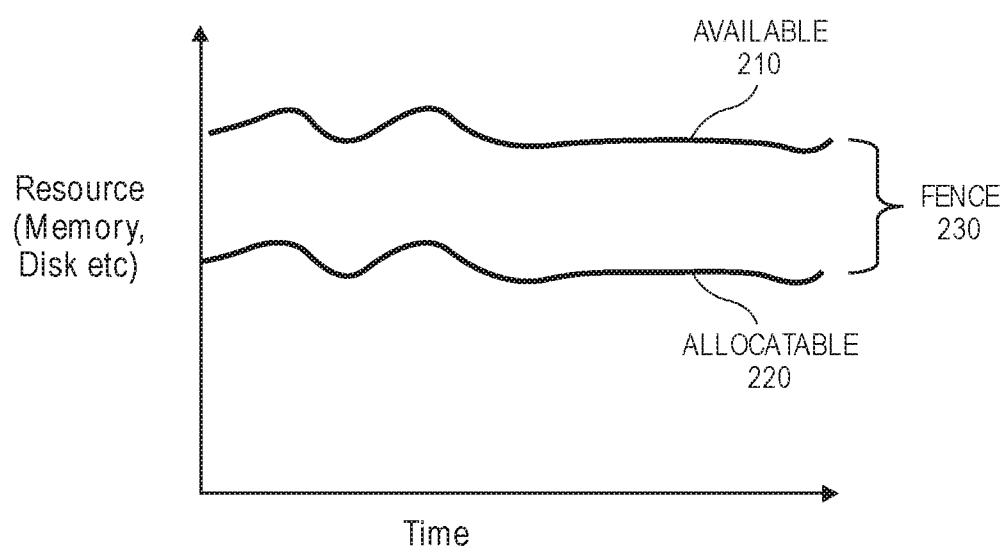
FIG. 2 is a conceptual illustration of a scavengable resource where a resource utilization fence is being utilized.

FIG. 2 is a conceptual illustration of a scavengable resource where a resource utilization fence is being utilized. While the example of FIG. 2 is directed to a memory/storage resource, the allocation fencing techniques described herein can be applied to other sharable resources (e.g., processing, bandwidth) as well.

As illustrated in the example of FIG. 2, available line 210 indicates the amount of the sharable resource (e.g., memory, disk, cache) that is expected to be unused during the prediction period (e.g., 10 minutes, 20 minutes, one hour, 45 seconds). As described in greater detail above, the available amount is a predicted unused portion of the resource. Allocatable line 220 indicates the amount of the resource that is to be made available and can be allocated to one or more other processes.

Fence 230 indicates the difference between the unused portion of the resource and the portion of the resource that is to be made available for other processes. In one embodiment, the amount of the resource that is unused varies over time, but the fence size is maintained as substantially constant.

The size of the resource utilization fence can be an important factor in overall system performance during relatively high load conditions. In various embodiments, the size of the resource utilization fence can be based on one or more of the following factors. In one embodiment, sensitivity of the native process to the resource(s) potentially allocated/being scavenged can be a factor in the resource utilization fence size. For example, some threads/applications can be distributed in nature and do not suffer from a performance degradation when a resource limit is applied.

In one embodiment, sensitivity of the thread/application utilizing the allocated resource(s) can be a factor in the resource utilization fence size. For example, if the thread/application creates multiple copies of data on scavenged memory and if one of the allocated resources is eliminated, the thread/application may continue to function utilizing the other copies of the data.

In one embodiment, predictions for upcoming loads, which can predict load changes, the nature of load changes (e.g., gradual or spike), and/or other relevant characteristics can be a factor in the resource utilization fence size. In some embodiments, a fixed size can be utilized, for example, 10% of the free resource, 15% of the resource utilized by the native thread, 12% of the predicted free resource, 18% of the predicted utilization by the native thread. These are just a few examples.

In one embodiment, the following equation can be utilized to determine the resource utilization fence size:

$$Fence = k + (s1 + s2 + \ldots) + (q1 + q2 + \ldots) + P$$

In the example equation, k is a constant that can be determined by, for example, host/application sizing. The 's' variables (e.g., s1, s2, s3, . . . ) indicate one or more sensitivity factors for the native thread. The 'q' variables (e.g., q1, q2, q3, . . . ) indicate one or more sensitivity factors for the thread(s)/application(s) utilizing the scavenged resource. P is a value determined by a load prediction mechanism. This equation is one example of a resource utilization fence sizing equation. Other equations can be utilized. Using the example equation above, for scavenging DRAM from one host with one native thread and one application running the scavenged DRAM, the following fence size can be utilized:

$$18\% = 5\% + (5) + (0) + 8$$

That is, k=5%, native thread sensitivity=5%, scavenging application sensitivity=0% and P=8%.

In one embodiment, fence 230 is monitored from both sides to determine whether any of the processes utilizing the shared resource has encroached on fence 230. In one embodiment, if the native process consumes an unexpected amount of the shared resource, reclaiming the shared portion of the resource can be initiated. Conceptually, this is illustrated by the native process crossing available line 210 into fence 230 region. Similarly, if one or more of the other processes sharing the resource consume an unexpected amount of the shared resource, reclaiming the shared portion of the resource can be initiated. Conceptually, this is illustrated by the other process crossing allocatable line 220 into fence 230 region.

Figure 3:
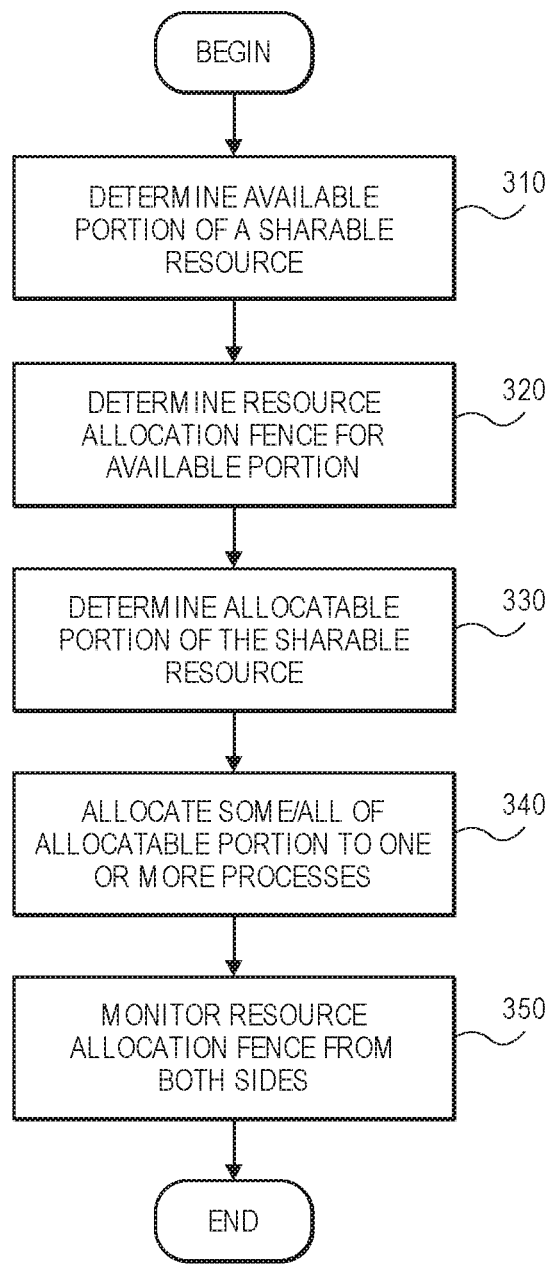
FIG. 3 is a flow diagram of one embodiment of a technique for managing a resource allocation fence.

FIG. 3 is a flow diagram of one embodiment of a technique for managing a resource allocation fence. In one embodiment, the operations described with respect to FIG. 3 can be performed within an on-demand services environment having many physical computing platforms. In alternate embodiments, the operations described with respect to FIG. 3 can be performed by any group of networked computing devices.

The available portion of a sharable resource (e.g., memory, storage, processing time) is determined, 310. In one embodiment, the available portion of the sharable resource is determined as described above. In one embodiment, the available portion of the sharable resource is the portion/amount of the sharable resource that it anticipated to be unused for the next segment of time (e.g., 10 minutes, 30 minutes, 45 seconds).

The resource allocation fence is determined for the available portion of the sharable resource, 320. As described above, the resource allocation fence is the portion of the available sharable resource that is reserved as a buffer between the portion of the sharable resource used by the native process and the portion of the sharable resource that is to be allocated to one or more other processes. The resource allocation fence can be, for example, a pre-selected percentage of the available portion of the sharable resource. In some embodiments, a more complex analysis is utilized to determine the resource allocation fence size.

The allocatable portion of the sharable resource is determined, 330. In one embodiment, the resource allocation fence is deducted from the available portion of the sharable resource to determine the allocatable portion of the sharable resource. In alternate embodiments, other configurations can be utilized, for example, the difference between the available portion and the allocatable portion can be the resource allocation fence and an overhead/management portion.

Some or all of the allocatable portion of the shared resource is allocated (or made available) to one or more other processes, 340. The allocatable portion can be made available individually or as part of a group of resources. In one embodiment, a group of resources can be classified based on one or more characteristics, as described in greater detail above.

Figure 4:
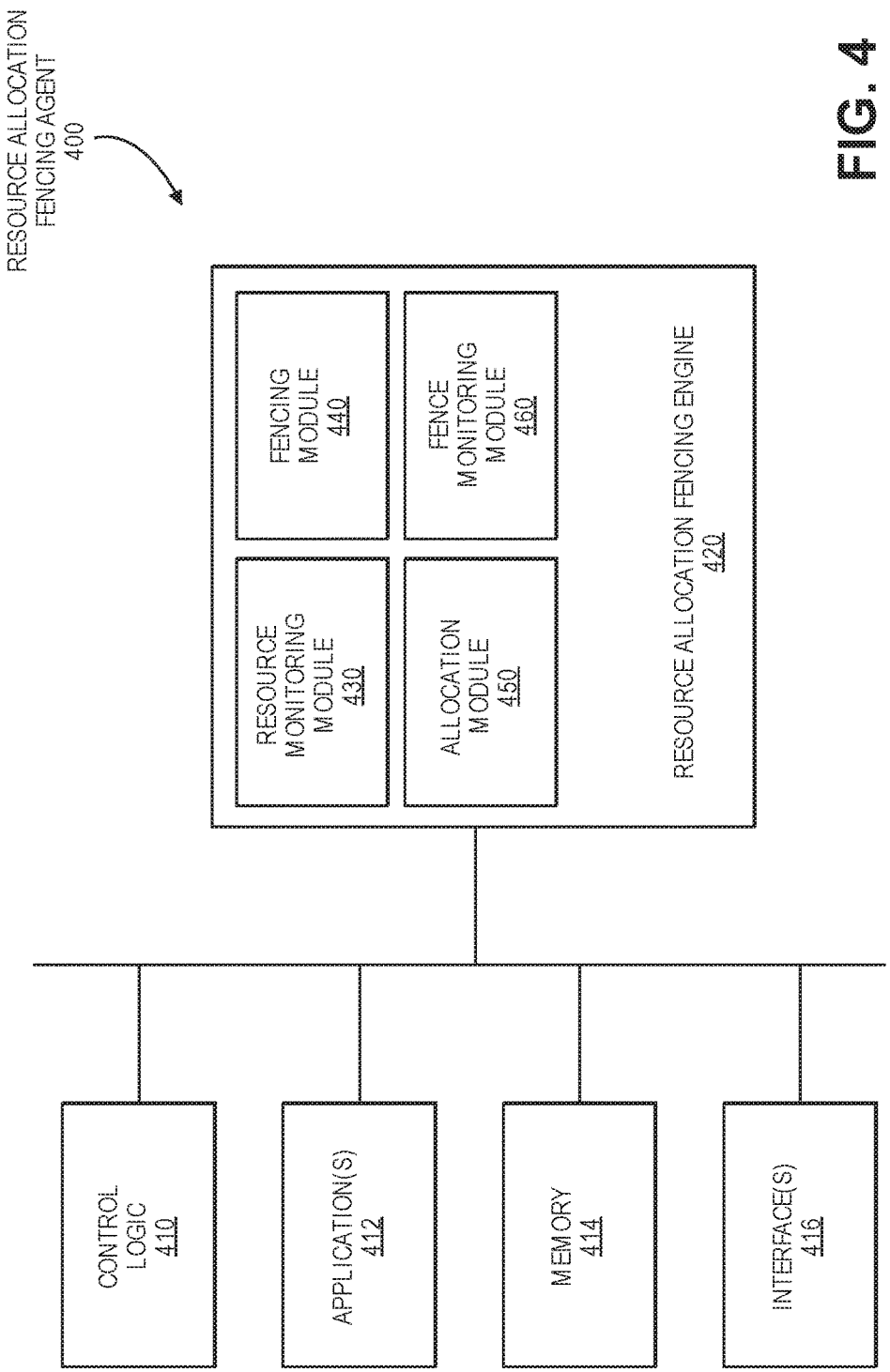
FIG. 4 is a block diagram of one embodiment of an agent that can function to manage a resource allocation fence.

FIG. 4 is a block diagram of one embodiment of an agent that can function to manage a resource allocation fence. Resource allocation fencing agent 400 includes control logic 410, which implements logical functional control to direct operation of resource allocation fencing agent 400, and/or hardware associated with directing operation of resource allocation fencing agent 400. Logic may be hardware logic circuits and/or software routines. In one embodiment, resource allocation fencing agent 400 includes one or more applications 412, which represent code sequence and/or programs that provide instructions to control logic 410.

Resource allocation fencing agent 400 includes memory 414, which represents a memory device and/or access to a memory resource for storing data and/or instructions. Memory 414 may include memory local to resource allocation fencing agent 400, as well as, or alternatively, including memory of the host system on which resource allocation fencing agent 400 resides. Resource allocation fencing agent 400 also includes one or more interfaces 416, which represent access interfaces to/from (an input/output interface) resource allocation fencing agent 400 with regard to entities (electronic or human) external to resource allocation fencing agent 400.

Resource allocation fencing agent 400 also includes resource allocation fencing engine 420, which represents one or more functions or module that enable resource allocation fencing agent 400 to provide the scavenging functionality as described above. The example of FIG. 4 provides several modules that may be included in resource allocation fencing engine 420; however, different and/or additional modules may also be included. Example modules that may be involved in providing the resource allocation fencing functionality include resource monitoring module 430, fencing module 440, allocation module 450 and fence monitoring module 460.

In one embodiment, resource monitoring module 430 operates to monitor/check utilization of one or more resources including, for example, memory/storage/cache capacity, processor bandwidth, memory system bandwidth, network (wired or wireless) bandwidth, battery power, cryptographic processing, etc. Resource monitoring module 430 can be utilized to monitor any number or combination of host systems having resources that can be scavenged as described herein.

Fencing module 440 operates to determine the resource allocation fence size to be applied to the available resource portion. In one embodiment, fencing module 440 can apply a fixed analysis (e.g., predetermined percentage, predetermined size) to the available resource portion to determine the resource allocation fence size. In other embodiments, fencing module 440 can apply a dynamic analysis to determine the resource allocation fence size, for example, a percentage based on dynamically monitored conditions.

Allocation module 450 operates to allocate the allocatable portion of the resource to one or more remote hosts (or threads). Alternatively, allocation module 450 can operate to expose (or advertise) the availability of the allocatable portion of the resource to one or more remote hosts (or threads).

Fence monitoring module 460 operates to monitor resource utilization by the native thread as well as resource utilization by the one or more remote hosts/threads. In one embodiment, when one of the threads utilizes the resource in a way that one of the fence boundaries (e.g., as conceptually illustrated in FIG. 2) is crossed, a response is triggered. As discussed above, the response can initiate the unraveling of the resource sharing. In another embodiment, the response can be adjustment of the fence boundaries.

Figure 5:
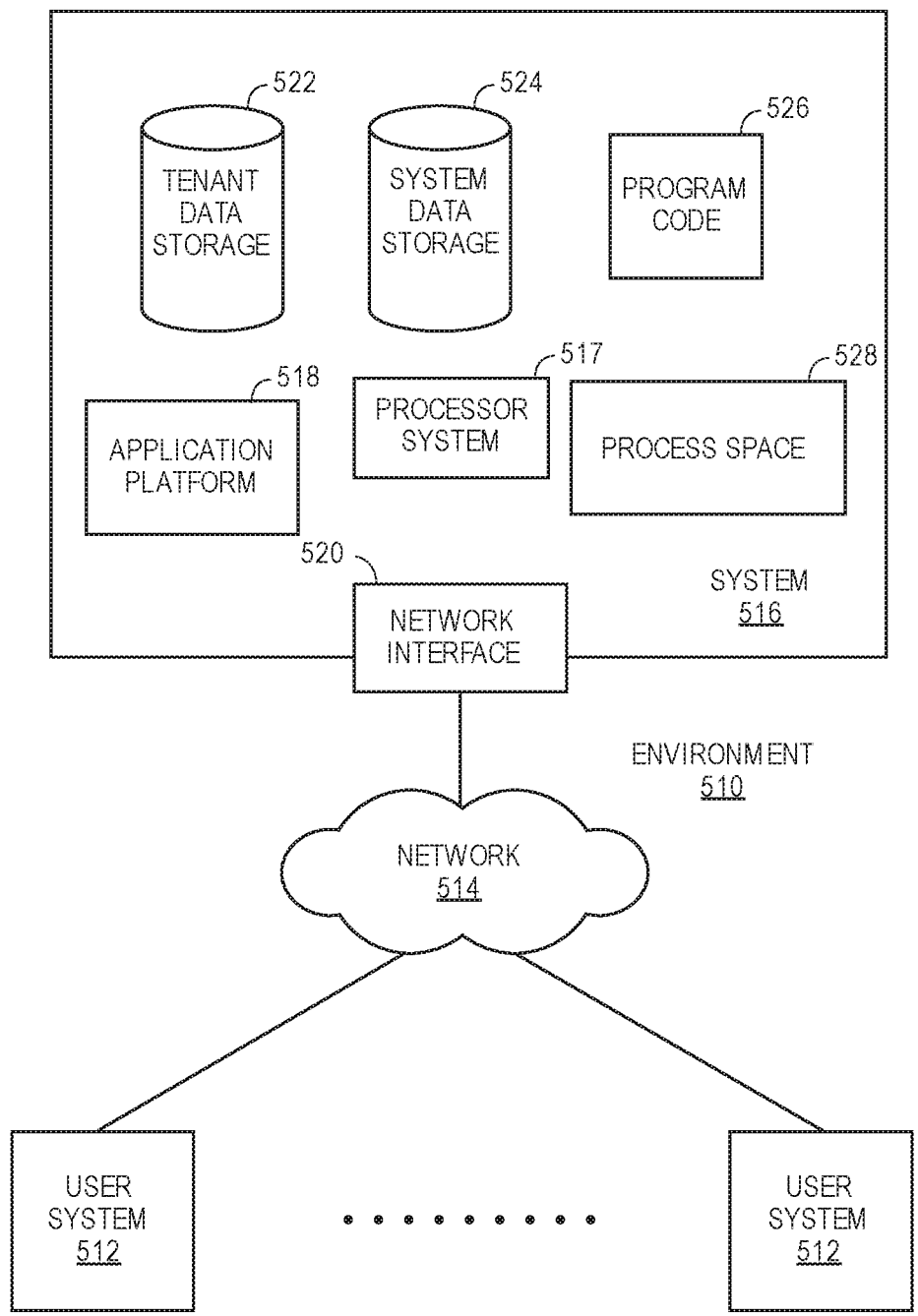
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such asEdge from Microsoft, Safari from Apple, Chrome from Google, or a WAP-enabled browser in the case of a cell phone, or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Core series processor or the like. Similarly, system 516 (and additional instances of an MTS, where more than one is present) and all of their components might be operator configurable using application(s) including computer code to run using a central processing unit such as processor system 517, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
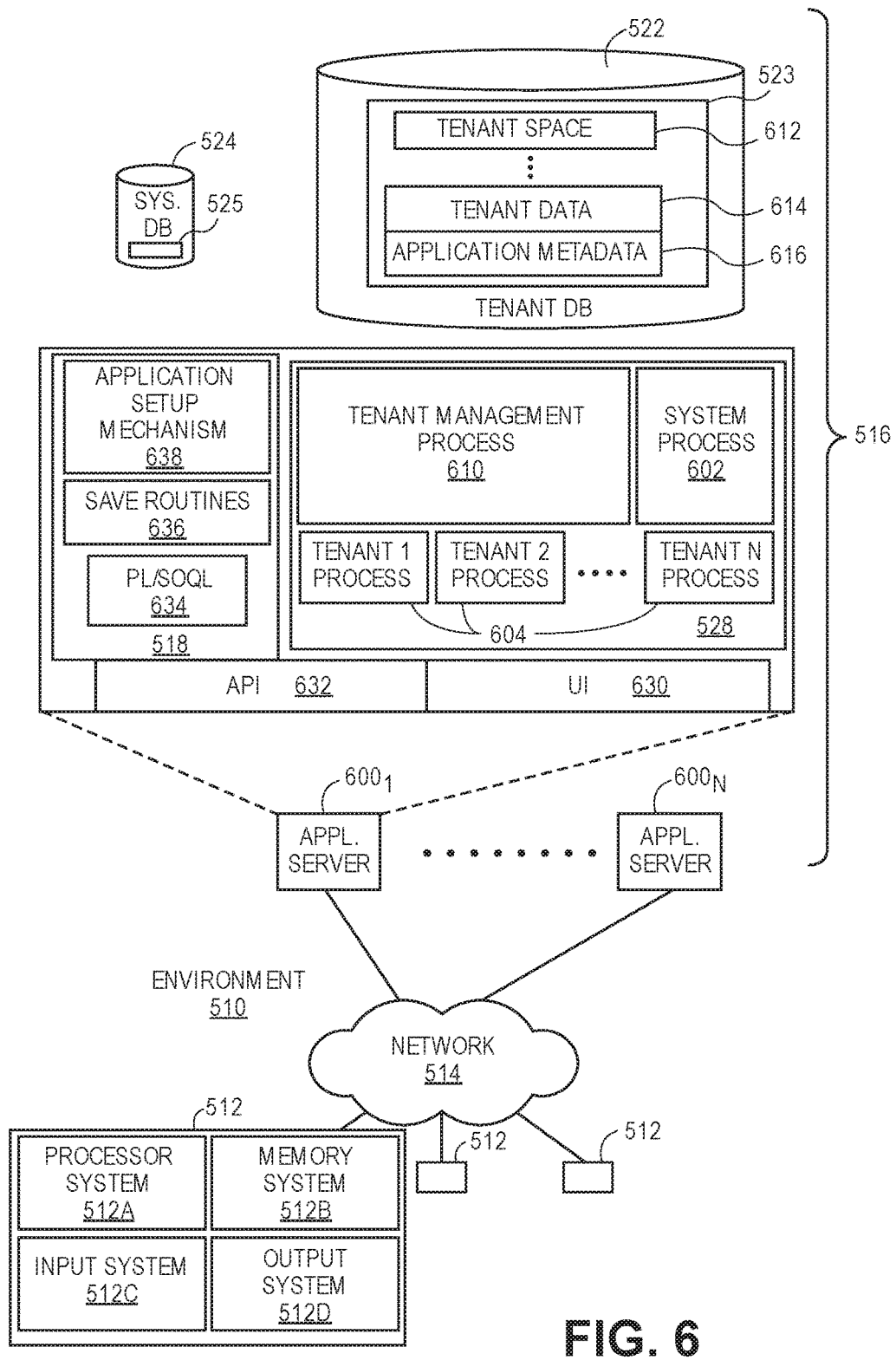
FIG. 6 illustrates a block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$400_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 BIG-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. In a computing environment having a first plurality of executing processes being executed by one or more processors, the executing processes each having associated resources, wherein the executing processes utilize the associated resources partially, a method comprising:

determining a consumed portion of a resource from the associated resources utilized by a selected executing process from the executing processes;

allocating a first preselected amount of an unconsumed portion of the resource for utilization by a process not in the first plurality of executing processes;

reserving a second preselected amount of the unconsumed portion of the resource as an allocation fence between the consumed portion of the resource and the allocated first preselected amount, wherein a fence size for the allocation fence is a difference between the unconsumed portion of the resource and the allocated first preselected amount of the unconsumed portion of the resource, and the fence size is based on load prediction characteristics for the resource, further wherein the second preselected amount of the unconsumed portion of the resource corresponds to the allocation fence is not allocated to a process;

dynamically adjusting the allocation fence size and resource allocations based on the load prediction characteristics for the resource;

monitoring utilization of the allocated unconsumed portion of the resource by the process not in the first plurality; and reducing the allocation of the first preselected amount in response to utilization exceeding a preselected threshold by reallocating utilization of the resource by the process not in the first plurality to another resource not in the associated resources.

2. The method of claim 1 wherein the load prediction characteristics are estimated by a load prediction agent.

3. The method of claim 1 further comprising:

monitoring utilization of the consumed portion of the resource by the selected executing process;

reducing the allocation of the first preselected amount in response to one or more sensitivity factors for the selected executing process.

4. The method of claim 3 wherein reducing the allocation comprises reallocating utilization of the resource by the process not in the first plurality to another process not in the first plurality.

5. The method of claim 1 wherein the resources comprise at least virtual memory capacity.

6. The method of claim 1 wherein the resources comprise at least physical memory capacity.

7. The method of claim 1 wherein the resources comprise at least virtual processor capacity.

8. The method of claim 1 wherein the resources comprise at least physical processor capacity.

9. The method of claim 1 wherein the resources comprise at least cache memory capacity.

10. The method of claim 1 wherein the resources comprise at least database capacity.

11. The method of claim 1 wherein the process not in the first plurality of executing processes is executed by different physical processors than the first plurality of executing processes.

12. A non-transitory computer-readable medium having stored thereon instructions that, when executed by one or more processors, are configurable to cause the one or more processors to provide a first plurality of executing processes being executed by the one or more processors, the executing processes each having associated resources, wherein executing processes utilize the associated resources partially, the executing instructions further configurable to cause the one or more processors to:
- determine a consumed portion of a resource from the associated resources that is utilized by a selected executing process from the first plurality of executing processes;
- allocate a first preselected amount of an unconsumed portion of the resource for utilization by a process not in the first plurality of executing processes;
- reserve a second preselected amount of the unconsumed portion of the resource as an allocation fence between the consumed portion of the resource and the allocated first preselected amount, wherein a fence size is a difference between the unconsumed portion of the resource and the first preselected amount and is based on load prediction characteristics, the unconsumed resource portion corresponding to the allocation fence is not to be allocated to a process;
- dynamically adjust the allocation fence size and resource allocations based on the load prediction characteristics
- monitor utilization of the allocated unconsumed portion of the resource by the process not in the first plurality; and
- reduce the allocation of the first preselected amount in response to utilization exceeding a preselected threshold by reallocating utilization of the resource by the process not in the first plurality to another resource not in the associated resources.

13. The non-transitory computer-readable medium of claim 12 wherein load prediction characteristics are estimated by a load prediction agent.

14. The non-transitory computer-readable medium of claim 12 further comprising instructions that, when executed by the one or more processors, are configurable to cause the one or more processors to:
- monitor utilization of the allocated unconsumed portion of the resource by the process not in the first plurality;
- reduce the allocation of the first preselected amount of in response to utilization exceeding a preselected threshold.

15. The non-transitory computer-readable medium of claim 14 wherein reducing the allocation comprises reallocating utilization of the resource by the process not in the first plurality to another resource not in the associated resources.

16. The non-transitory computer-readable medium of claim 12 wherein the resources comprise at least virtual memory capacity.

17. The non-transitory computer-readable medium of claim 12 wherein the resources comprise at least physical memory capacity.

18. The non-transitory computer-readable medium of claim 12 wherein the resources comprise at least virtual processor capacity.

19. The non-transitory computer-readable medium of claim 12 wherein the resources comprise at least physical processor capacity.

20. The non-transitory computer-readable medium of claim 12 wherein the resources comprise at least cache memory capacity.

21. The non-transitory computer-readable medium of claim 12 wherein the resources comprise at least database capacity.

22. The non-transitory computer-readable medium of claim 12 wherein the process not in the first plurality of executing processes is executed by different physical processors than the first plurality of executing processes.

23. A system to provide a computing environment having a first plurality of executing processes being executed by one or more processors, the executing processes each having associated resources, wherein executing processes utilize the associated resources partially, the system to:
- determine a consumed portion of a resource from the associated resources that is utilized by a selected executing process from the first plurality of executing processes;
- allocate a first preselected amount of an unconsumed portion of the resource for utilization by a process not in the first plurality of executing processes;
- reserve a second preselected amount of the unconsumed portion of the resource as an allocation fence between the consumed portion of the resource and the allocated first preselected amount, wherein a fence size is a difference between the unconsumed portion of the resource and the first preselected amount and is based on load prediction characteristics, the unconsumed resource portion corresponding to the allocation fence is not to be allocated to a process;
- dynamically adjust the allocation fence size and resource allocations based on the load prediction characteristics;
- monitoring utilization of the allocated unconsumed portion of the resource by the process not in the first plurality; and
- reducing the allocation of the first preselected amount in response to utilization exceeding a preselected threshold by reallocating utilization of the resource by the process not in the first plurality to another resource not in the associated resources.

24. The system of claim 23 further configurable to:
- monitor utilization of the consumed portion of the resource by the selected executing process;
- reduce the allocation of the first preselected amount of the unconsumed portion of the resource in response to utilization exceeding a preselected threshold.

25. The system of claim 24 wherein reducing the allocation comprises reallocating utilization of the resource by the process not in the first plurality to another process not in the first plurality.

* * * * *